United States Patent [19]
Goto et al.

[11] Patent Number: 5,188,006
[45] Date of Patent: Feb. 23, 1993

[54] SHIFT CONTROL APPARATUS FOR AUTOMATIC TRANSMISSIONS

[75] Inventors: Shigeki Goto, Kariya; Masato Shimei, Nagoya, both of Japan

[73] Assignee: Aisin Seiki Kabushiki Kaisha, Kariya, Japan

[21] Appl. No.: 604,503

[22] Filed: Oct. 29, 1990

[30] Foreign Application Priority Data

Oct. 31, 1989 [JP] Japan .................................. 1-281798

[51] Int. Cl.$^5$ .............................................. B60K 41/06
[52] U.S. Cl. .................................................. 74/867
[58] Field of Search .......................... 74/866, 867, 868

[56] References Cited
U.S. PATENT DOCUMENTS

| | | | |
|---|---|---|---|
| 4,893,527 | 1/1990 | Furusawa et al. | 74/866 |
| 4,928,557 | 5/1990 | Takada et al. | 74/866 X |
| 4,934,218 | 6/1990 | Takase et al. | 74/868 |

Primary Examiner—Leslie A. Braun
Assistant Examiner—Ryan Massey
Attorney, Agent, or Firm—Burns, Doane, Swecker & Mathis

[57] ABSTRACT

A shift control apparatus for an automatic transmission includes a kickdown orifice control valve for changing over two systems of hydraulic-pressure supply lines which supply hydraulic pressure to friction engaging elements on an engaging side via at least one orifice by sliding a spool between a first position at which the spool is urged by a spring and a second position at which the spool is urged by changeover hydraulic pressure acting in a direction opposite the spring, a solenoid valve mounted at a point along a line which introduces the changeover hydraulic pressure, and control means for controlling opening and closing of the solenoid valve, e.g., by duty-control or timer. Duty control is made according to vehicle velocity and throttle opening and corrected according to the engine rotational state.

7 Claims, 9 Drawing Sheets

SHIFT CONTROL APPARATUS FOR AUTOMATIC TRANSMISSIONS

BACKGROUND OF THE INVENTION

This invention relates to a shift control apparatus for an automatic transmission and, more particularly, to a shift control apparatus capable of obtaining an optimum shift timing at the time of a kickdown shift.

Shifting in an automatic transmission is achieved by a combination of engagements of such elements as a one-way clutch, a band brake and multi-plate friction engaging elements, or by a combination of engagements of multi-plate friction engaging elements.

In a shift control apparatus which relies upon the combination of engagements of multi-plate friction engaging elements, a known method of controlling shift shock at the time of a kickdown shift is to slow down, in dependence upon the prevailing vehicle velocity, the rate of a rise in the hydraulic pressure of the engaging elements on the engaging side, which hydraulic pressure rises in conformity with a decline in the hydraulic pressure of the engaging elements on the disengaging side.

An arrangement described in the Toyota Toyace New Car Manual (1984-8), pp. 5-53, can be mentioned as a conventional shift control apparatus which controls shift shock at the time of a kickdown shift using the aforementioned method.

Analysis of the Prior Art

As shown in FIGS. 11 through 13, this conventional shift control apparatus is so adapted that a 3-2 kickdown orifice control valve 1 is changed over in conformity with vehicle velocity so that a multiple-stage rate of increase in hydraulic pressure on the engaging side is brought about by two orifices 2, 3 provided in an oil line L1 on the engaging side.

More specifically, the 3-2 kickdown orifice control valve 1 shown in FIGS. 11 through 13 acts to slow down the operation of a second brake B2, namely a rise in an engaging hydraulic pressure $P_{B\,2}$, in conformity with a decline in the hydraulic pressure $P_{C\,2}$ of a direct clutch C2 at the time of a 3-2 kickdown. Governor pressure Pg is used as a signal indicative of vehicle velocity.

If the vehicle velocity and, hence, the governor pressure Pg, is low, the force of a spring 1A of the 3-2 kickdown orifice control valve 1 raises a spool 1B against the governor pressure Pg supplied through an oil line L2 to open upper and lower ports, namely a first port 1a and a lower port 1b, as shown in FIG. 11. As a result, the major part of the line pressure $P_L$ from a 2-3 shift valve (not shown) is introduced from oil line L1 to the first port 1a via the first orifice 2, and the line pressure $P_L$ is supplied from the output port 1c to the second brake B2 via an oil line L3.

If the vehicle is traveling at medium velocity, the governor pressure Pg rises from the state shown in FIG. 11 and urges the spool 1B to an intermediate position. As a result, as shown in FIG. 12, the second port 1b and output port 1c are communicated, just as in the case of the low velocity described above, but the first port 1a and output port 1c are communicated via an orifice 1C formed in the spool 1B. Consequently, the supply of hydraulic pressure to the second brake B2 takes place more gently than in the case of FIG. 11.

When a high velocity is attained and governor pressure Pg rises further, the spool 1B is urged downward fully to close off the first port 1a, as shown in FIG. 13. As a result, the line pressure $P_L$ supplied to the second brake B2 becomes solely the hydraulic pressure supplied to the second port 1b via the first orifice 2 and second orifice 3. The second brake pressure B2 therefore rises even more gently than before, thereby mitigating shift shock.

SUMMARY OF THE DISCLOSURE

Problems to be Solved by the Invention

A problem encountered in the conventional shift control apparatus described above is that since hydraulic pressure on the engaging side is changed over in three stages, namely at low, medium and high vehicle velocities, a very fine setting for the purpose of mitigating shift shock is difficult to achieve. In addition, since the governor pressure is used as the signal indicative of vehicle velocity, errors among manufactured parts and changes with the passage of time cannot be corrected for. Since there is a large variance in changeover-point vehicle velocity owing to differences in governor pressure and spring load, etc., a three-stage changeover is the limit, even though attempts have been made to increase the number of stages through which the kickdown orifice control valve can be changed over.

Primary Purpose

The present invention has been devised in order to eliminate the aforementioned drawbacks possessed by the conventional shift control apparatus for automatic transmissions described above.

More specifically, an object of the present invention is to provide a shift control apparatus for an automatic transmission in which the changeover in the rate of increase in engaging hydraulic pressure, which is applied to multi-plate friction engaging elements (clutches and brakes) on the engaging side at the time of kickdown shift in an automatic transmission, can be set to any number of stages in accordance with need.

Another object of the present invention is to provide a shift control apparatus for an automatic transmission in which errors among manufactured parts and changes with the passage of time can be corrected for with ease.

Still another object of the present invention is to provide a shift control apparatus for an automatic transmission in which optimum shift timing at the time of a kickdown shift can be set.

Solution by the Invention

According to the present invention, the foregoing objects are attained by providing a shift control apparatus for an automatic transmission comprising a kickdown orifice control valve for changing over two systems of hydraulic-pressure supply lines which supply hydraulic pressure to friction engaging elements on an engaging side via at least one orifice by sliding a spool between a first position at which the spool is urged by a spring and a second position at which the spool is urged by changeover hydraulic pressure acting in a direction opposite the spring, a solenoid valve mounted at a point along a line which introduces the changeover hydraulic pressure, and control means for controlling opening and closing of the solenoid valve.

Preferred embodiments of the present invention are as follows:

(1) The two systems of hydraulic-pressure supply lines comprise a line for supplying hydraulic pressure via one orifice and a line for supplying hydraulic pressure via two orifices.

(2) The control means has duty control means for controlling the duty ratio of the solenoid valve based upon a duty ratio corresponding to vehicle velocity and throttle opening.

(3) The control means has correcting means for detecting engine rotational speed and correcting the duty ratio in conformity with the rotating state of the engine.

(4) The control means has delay means for delaying operation of the solenoid valve by a length of time corresponding to vehicle velocity and throttle opening following output of a shift command signal.

General Function

The shift control apparatus of the invention is such that when the solenoid valve is opened by the control means so that the changeover hydraulic pressure does not act upon the spool, the latter is urged by the spring and situated at the first position (as shown by the right half of the spool in FIG. 2) so that the kickdown orifice control valve selects the hydraulic-pressure supply line that supplies hydraulic pressure via one orifice, by way of example, thereby shortening the rise time of the hydraulic pressure in the friction engaging elements on the engaging side.

When the solenoid valve is closed by the control means and the changeover hydraulic pressure acts upon the spool, the latter is changed over to the second position (as shown by the left half of the spool in FIG. 2) against the force of the spring, so that the kickdown orifice control valve selects the hydraulic-pressure supply line that supplies hydraulic pressure via two orifices, by way of example, thereby lengthening the rise time of the hydraulic pressure in the friction engaging elements on the engaging side.

The duty ratio of the solenoid valve is controlled by the control means based upon a duty ratio corresponding to the vehicle velocity and throttle opening, and the operation of the solenoid valve is delayed by the control means by a length of time corresponding to the vehicle velocity and throttle opening. By repeatedly changing over the kickdown orifice control valve or by delaying this changeover by a prescribed length of time, the rise time of the hydraulic pressure in the frictional engaging elements on the engaging side can be set to any time intermediate that in the case where the solenoid valve is opened and that in the case where the solenoid valve is closed. Additionally, the length of time of operation of the solenoid valve is corrected in accordance with the engine rotational state (e.g., rate of rise of engine rotation).

Further, the control means is adapted to detect engine rotational speed and correct the duty ratio in conformity with the rotating state of the engine, thereby dealing with variances among manufactured parts and changes with the passage of time. Thus, learning control is performed for eliminating engine revving and a vehicle braking phenomenon that are caused by inappropriate engagement time of the frictional engaging elements on the engaging side.

For operating the shift control apparatus, a shift control method comprises the following steps of:

(a) discriminating a shift command;

(b) when a shift command is discriminated at said step (a), deciding a duty ratio setting of said solenoid valve and an output time T thereof upon making a comparison with a map preset on a diagram of a two-dimensional coordinate system in which one axis is throttle opening and another axis is vehicle velocity;

(c) outputting a shift signal in accordance with the duty ratio setting and output time T decided at said step (b); and (d) outputting a predetermined duty ratio to said solenoid valve for the output time T decided.

The method further comprises a step (e) of monitoring engine rotational speed for a predetermined period of time T' upon elapse of the output time T, and discriminating whether a rate of rise of the engine rotational speed lies within predetermined limits.

The method at (e) further comprises a step (f) of discriminating if the rate of engine rotational speed has become negative, performing a correction to reduce the duty ratio and shorten engaging time.

The method mentioned at (e) further comprises a step (g) of performing a correction to enlarge the duty ratio and lengthen engaging time if the rate of rise of the engine rotational speed does not lie within the predetermined limits and is increasing markedly.

The method mentioned at (f) further comprises a step (h) of suspending the correction if a throttle opening greater than a predetermined throttle opening is detected within said predetermined period of time T' following elapse of the predetermined output time T.

The method mentioned at (g) further comprises a step (i) of suspending the correction if a throttle opening greater than a predetermined throttle opening is detected within said predetermined period of time T' following elapse of the predetermined output time T.

MERITORIOUS EFFECTS OF THE INVENTION

In accordance with the present invention as described above, the solenoid valve is opened and closed by the control means to change over the kickdown orifice control valve. As a result, hydraulic-pressure rise time in the frictional engaging elements on the engaging side at the time of kickdown shift can be set to any number of stage, or to be stageless, in conformity with the vehicle velocity and throttle opening. In addition, optimum shift timing can be set. Another advantage is that the vehicle velocity point at which the changeover occurs does not develop any variance. Owing to control by a learning process, a correction is applied to opening/closing control of the solenoid valve performed by the control means. This makes it possible to readily deal with errors among manufactured parts and changes with the passage of time.

DESCRIPTION OF THE PREFERRED EMBODIMENTS

Figure 1:
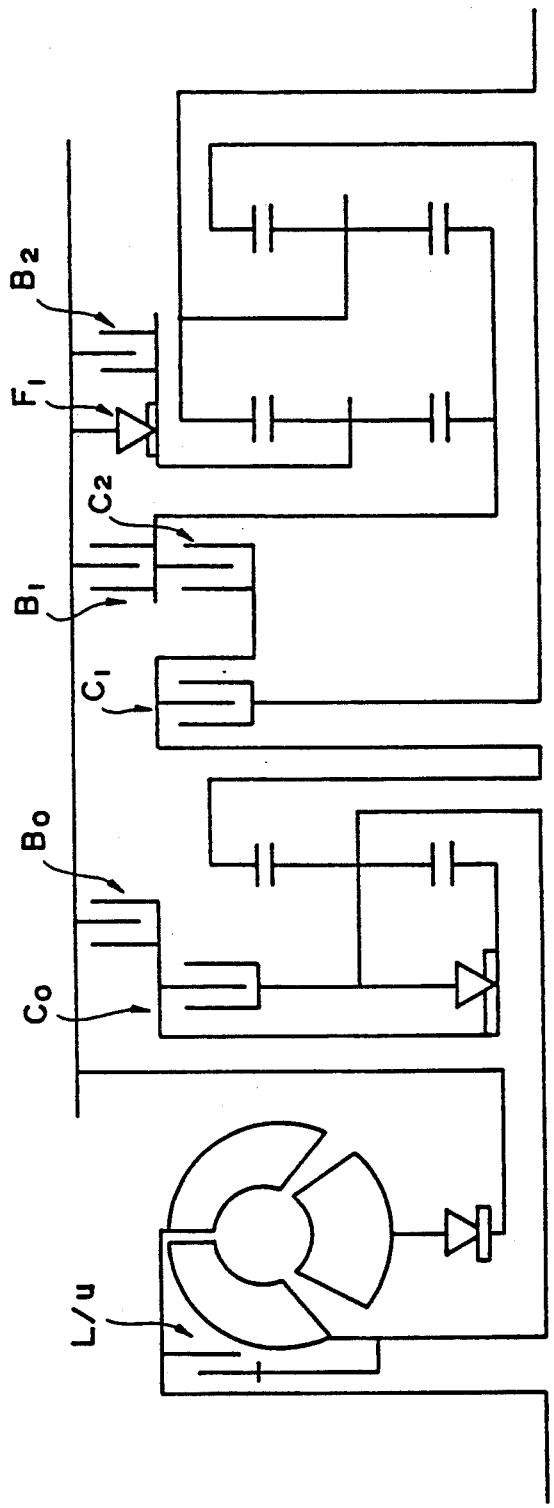
FIG. 1 is a diagram showing a gear train illustrating one example of an automatic transmission to which the present invention is applied.

The present invention will now be described in further detail based upon the embodiments illustrated in the drawings.

FIG. 1 illustrates a gear train of an automatic transmission having four forward speeds and using clutch-to-clutch shifting, which relies upon engaging and disengaging multi-plate frictional engaging elements. Engagement made of these engaging elements in each speed of the transmission is as shown in the following table:

TABLE

|   |     | C0 | C1 | C2 | B0 | B1 | B2 | SOL1 | SOL2 |
|---|-----|----|----|----|----|----|----|----|----|
|   | P   | O | X | X | X | X | X | O | O |
|   | R   | O | X | X | O | X | O | O | X |
|   | N   | O | X | X | X | X | X | O | O |
| D | 1   | O | O | X | X | X | X | X | O |
|   | 2   | X | O | X | X | O | X | O | O |
|   | 3   | O | O | O | X | X | X | O | X |
|   | O/D | X | O | O | O | X | X | X | X |
| 2 | 1   | O | O | X | X | X | X | X | O |
|   | 2   | O | O | X | X | O | X | O | O |
|   | L   | O | O | X | X | O | X | O | O |

(O: ON, X: OFF)

As will be understood from the table, a 3→2 kickdown shift by the automatic transmission of FIG. 1 is performed by releasing the direct clutch C2 and engaging the second brake B1.

Figure 2:
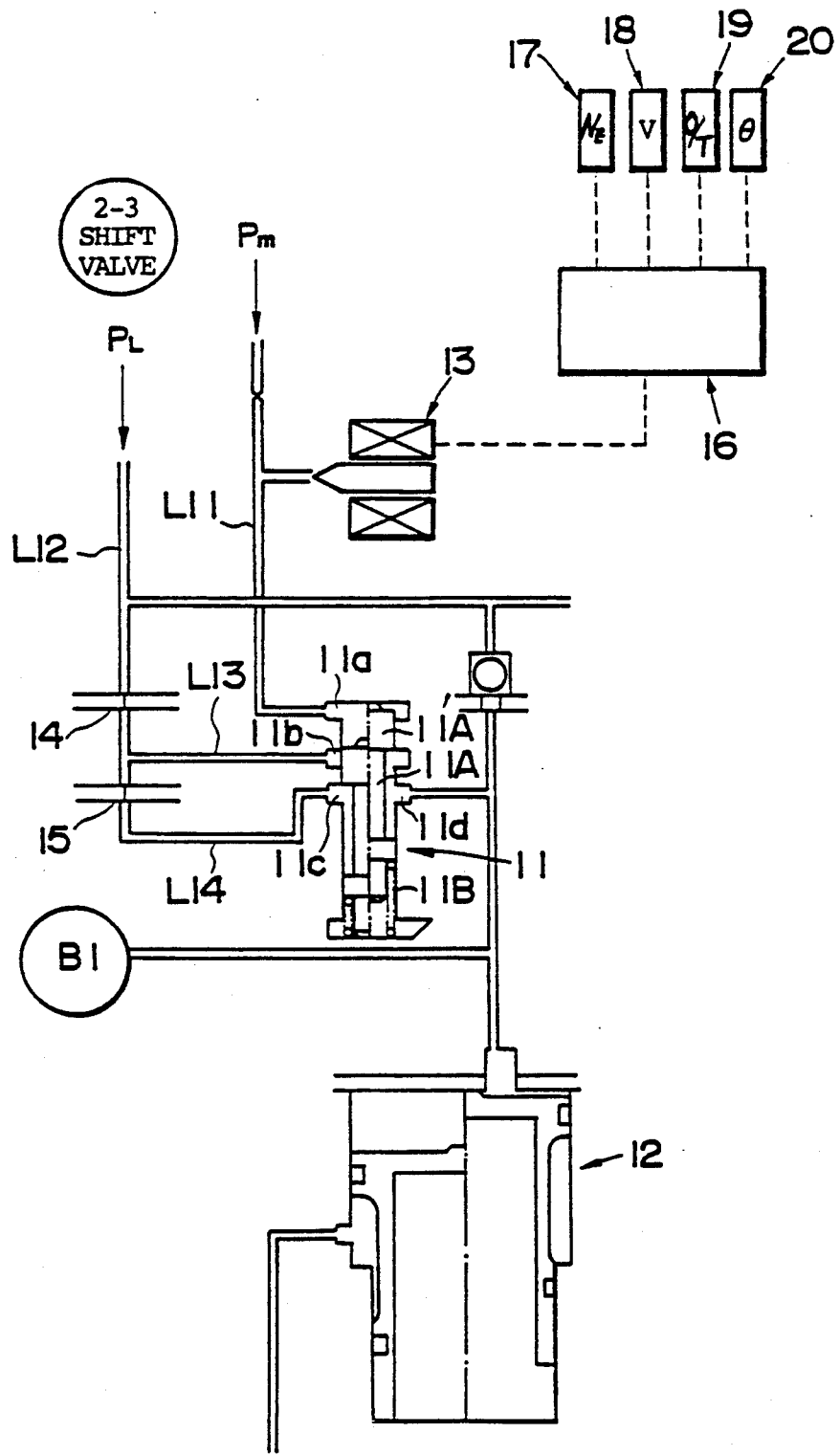
FIG. 2 is a hydraulic circuit diagram showing an embodiment of the present invention.

FIG. 2 illustrates a hydraulic circuit according to the present invention for performing the 3→2 kickdown shift by means of the automatic transmission shown in FIG. 1. Numeral 11 denotes a 3-2 kickdown orifice control valve, and numeral 12 denotes a B1 accumulator.

Modulated pressure Pm regulated to a constant pressure is introduced, from a line L11 via a first port 11a, to a chamber formed in the top of the 3-2 kickdown orifice control valve (hereinafter referred to as a "control valve"). This hydraulic pressure in the chamber acts upon a land 11A' to urge a spool 11A downward in the drawing against the force of a spring 11B. A timing-duty solenoid valve (hereinafter referred to as a "solenoid valve") 13 is connected to the line L11 introducing the modulator pressure Pm. (In the present embodiment, the solenoid valve is of the normally open type, though it is permissible to use a solenoid valve of the normally closed type.)

A line L12 to which line pressure $P_L$ (apply pressure to the second brake B1) from a 2-3 shift valve is introduced is connected to a second port 11b of the control valve 11 via a first orifice 14 and an oil line L13 and to a third port 11c of the control valve 11 via the first orifice 14, a second orifice 15 and a line L14. When a spool 11A of the control valve 11 occupies its upper position in FIG. 2 (indicated by the right half of the spool), the first port 11b and second port 11c are both connected to an output port 11d, which is connected to the second brake B1 and the B1 accumulator 12. When the spool 11A occupies its lower position in FIG. 2 (indicated by the left half of the spool), the second port 11b is closed and only the third port 11c is communicated with the output port 11d.

The solenoid valve 13 has a microcomputer 16 connected thereto and has its on/off action controlled by a command signal from the microcomputer. The latter receives, as inputs thereto, detection signals from an engine rotational speed ($N_E$) (e.g., turbine rotational speed of a torque converter) sensor 17, a vehicle velocity (V) sensor 18, an oil temperature (O/T) sensor 19, and a throttle ($\theta$) sensor 20, and outputs a signal for turning the solenoid valve ON and OFF.

ON/OFF control of the solenoid valve 13 by the microcomputer 16 at the time of a 3→2 kickdown shift will now be described based on the flowchart shown in FIG. 3.

After the program starts to be run at (a), the output rotational speed (rpm) of the transmission is read by the vehicle velocity sensor 18 at step (b), the throttle opening $\theta$ is read by the throttle sensor 20 at step (c), and it is decided at step (d), based on these detection signals, whether or not to perform the 3→2 shift. Running of the program is terminated if the 3→2 shift is not made (e).

Figure 4:
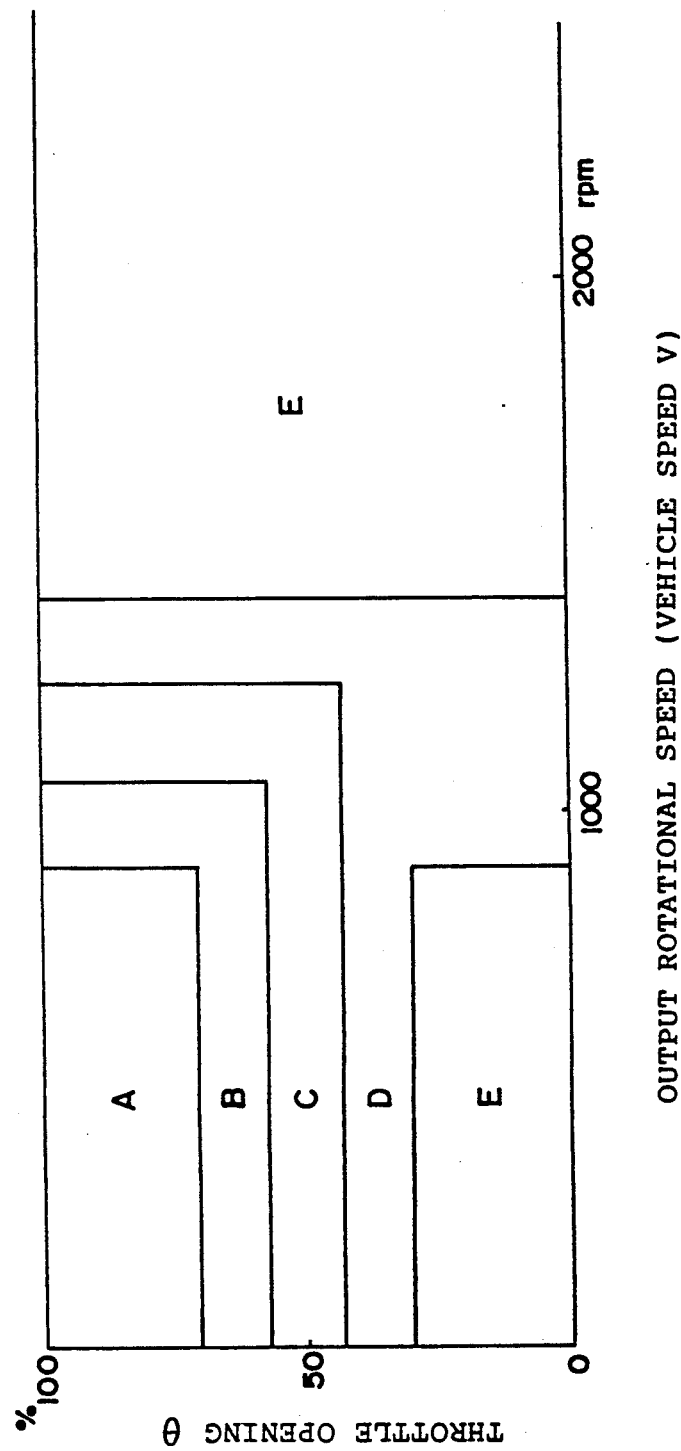
FIG. 4 is a map in the same computer control.

If it is decided to perform the 3→2 shift (f), the next detected output rotational speed (rpm) and throttle opening ($\theta$) are compared with the map shown in FIG. 4, and a driving duty ratio $\tau$ of the solenoid valve 13 and an output time T of this driving signal are decided (g).

The meanings of domains A through E in the map of FIG. 4 are as follows:

Domain A: solenoid valve 13 is normally turned OFF (opened) ($\tau = 0\%$)

Domain B: solenoid valve 13 is driven at a duty ratio $\tau_B$ and an output is delivered for a period of time $T_B$ Domain C: solenoid valve 13 is driven at a duty ratio $\tau_C$ and an output is delivered for a period of time $T_C$ Domain D: solenoid valve 13 is driven at a duty ratio $\tau_D$ and an output is delivered for a period of time $T_D$ Domain E: solenoid valve 13 is turned ON (closed) for a period of time $T_E$ ($\tau = 100\%$)

The above-mentioned duty ratios $\tau_B$, $\tau_C$ and $\tau_D$ and output times $T_B$, $T_C$ and $T_D$ are related as follows:

$$0 < \tau_B < \tau_C < \tau_D < 100$$

$$T_B < T_C < T_D < T_E$$

A kickdown (3→2) shift signal is outputted to the shifting solenoid SOL2 (not shown) for the 2-3 shift valve at step (h) to change the 2-3 shift valve over to the 2nd speed side. The timer t is started at step (i). After the timer t is started, it is judged at step (j) whether the output time T (e.g., $T_B$, $T_C$, $T_D$, or $T_E$) has elapsed. Until passage of the output time T (k), the duty ratio $\tau$ decided by the map is outputted to the solenoid valve 13 at step (l) to drive the solenoid valve 13.

Figure 5:
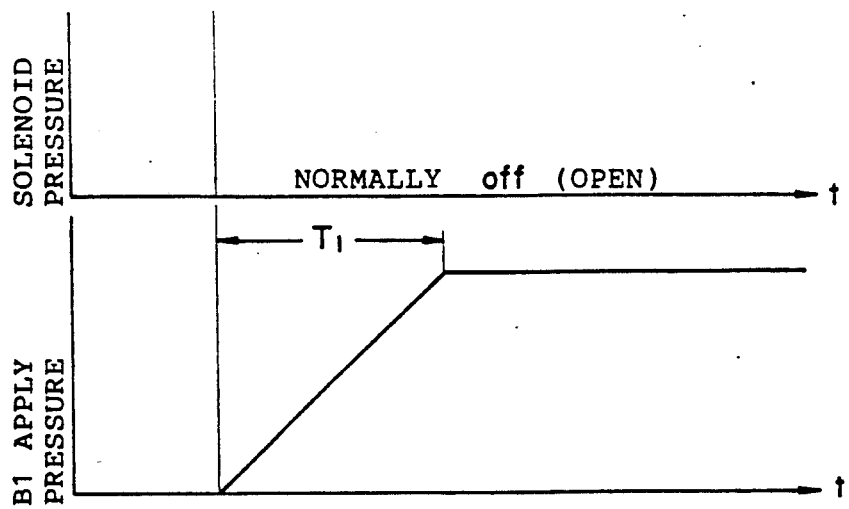
FIGS. 5 through 7 are hydraulic-pressure characteristics for illustrating the relationship between solenoid operation and hydraulic-pressure rise time in this embodiment.

When the traveling state of the vehicle as judged from the output rotational speed and throttle opening is in domain A of the map shown in FIG. 4, namely when the vehicle is traveling at a low velocity and is in an accelerating state (i.e., when there is a large throttle opening), the solenoid valve 13 attains the normally OFF state. In this state the modulator pressure $P_m$ from the line L11 in FIG. 2 is not applied to the first port 11a of the control valve 11, and the spool 11A is urged by the spring 11B to the upper position in FIG. 2 (the right half of FIG. 2). Thus the major part of line pressure $P_L$ (apply pressure to the second brake B1) from the 2-3 shift valve introduced from the line L12 is supplied to the second brake B1 via the first orifice 14, line L13, the second port 11b of control valve 11 and the output port 11d of the control valve. Accordingly, the rise time of the hydraulic pressure in the second brake B1 becomes a minimum time $T_1$, as illustrated in FIG. 5.

Figure 6:
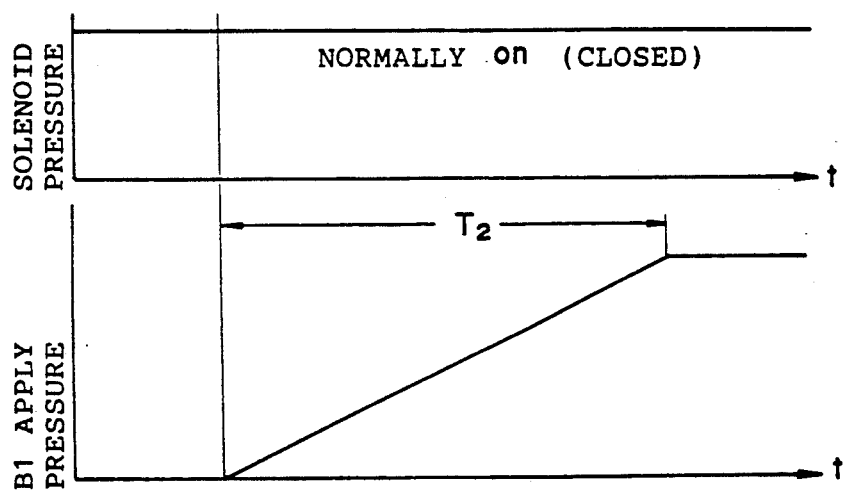
Figure 7:
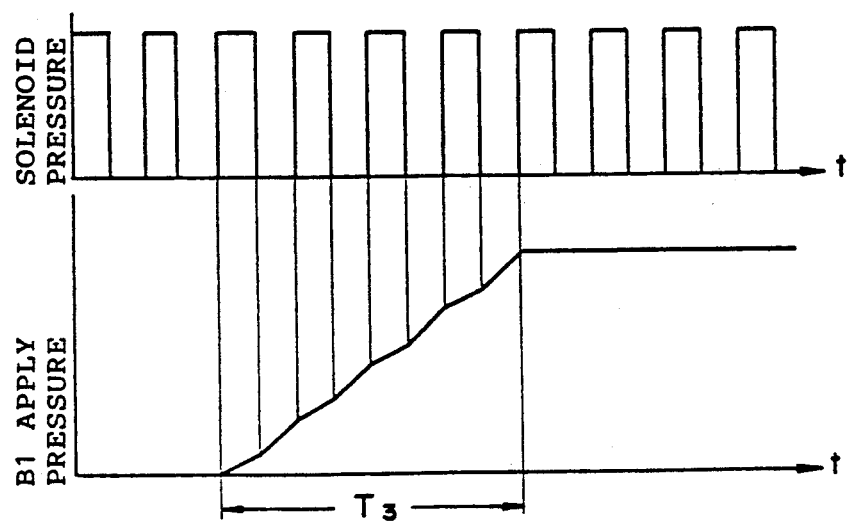

When the traveling state of the vehicle is in domain E of the map, namely when the vehicle is traveling at a high velocity or when the vehicle is traveling at a low velocity and the throttle opening is very small, the solenoid vale 13 is normally ON. The modulator pressure $P_m$ from the line L11 in FIG. 2 is applied to the first port 11a of the control valve 11, and the spool 11A is re-urged to the lower position in FIG. 2 (the left half of FIG. 2), thereby closing the second port 11b. As a result, line pressure $P_L$ from line L22 passes through the first and second orifices 14 and 15 and is supplied to the second brake B1 via the line L14, third port 11c and output port 11d. Accordingly, the rise time of hydraulic pressure in the second brake B1 becomes a maximum time $T_2$, as shown in FIG. 6.

When the traveling state of the vehicle is in domains B-D, namely when the vehicle is traveling at a medium velocity, the solenoid 13 is driven for the output times $T_B$-$T_D$ at the duty ratios $\tau_B$-$\tau_D$ decided by these domains. Accordingly, supply of hydraulic pressure to the second brake B1 is repeated, in conformity with the duty ratios $\tau_B$-$\tau_D$, through the path which traverses only the first orifice 14 and the path which traverses the first orifice 14 and the path which traverses the first orifice 14 and the second orifice 15, as described earlier. The rise time of hydraulic pressure in the second brake B1 becomes an intermediate time $T_3$ between the minimum time $T_1$ and the maximum time $T_2$ ($T_1 < T_3 < T_2$).

Depending upon the $\tau_B$-$\tau_D$ corresponding to the respective domains B-D, the larger the duty ratio, the longer the rise time $T_3$ of hydraulic pressure in the medium-velocity region. Accordingly, the number of domains in the medium-velocity region can be set. This makes it possible to perform control more finely than in the case of the map shown in FIG. 4. It is possible also to perform control in a stageless of stepless manner.

Figure 8:
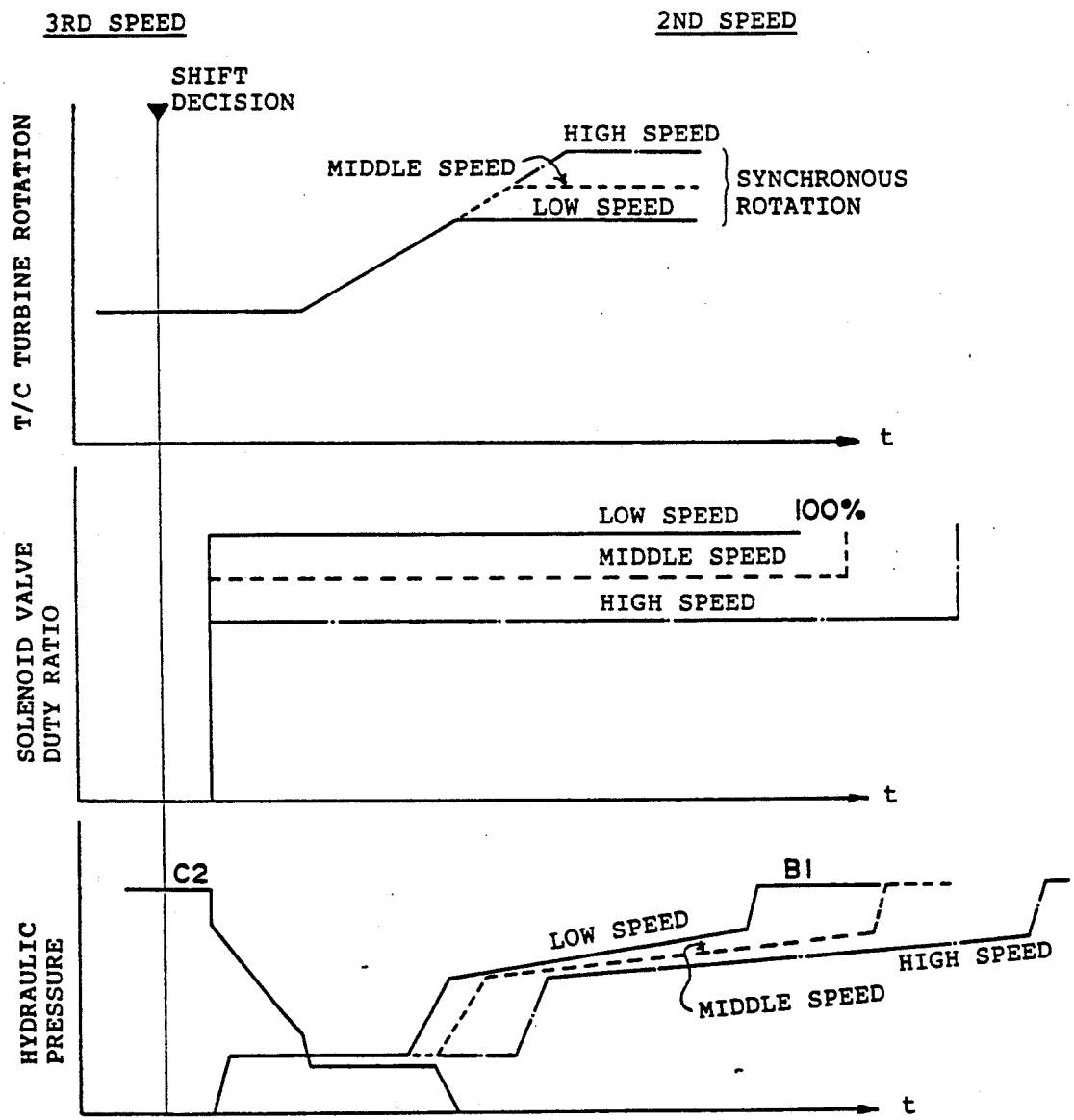
FIG. 8 is a hydraulic-pressure characteristic for illustrating the relationship between the rotational speed of a torque converter (T/C) turbine and engaging hydraulic pressure in this embodiment.

The difference between engine rotational speeds (the rotational speeds of the T/C turbine) in 2nd and 3rd speeds at the low vehicle velocity is smaller than that at the time of high vehicle velocity, as shown in FIG. 8, and the time required for engine rotation to be synchronized in the 2nd-speed state is shorter at lower vehicle velocities than at higher vehicle velocities. Accordingly, by hastening the rise in the hydraulic pressure of the second brake B1 more as the vehicle velocity declines and engaging the second brake B1 at the same time that synchronization of the engine rotational speed is achieved, as shown in FIG. 8, shift shock at the time of the 3-2 kickdown can be suppressed to a low level.

Figure 9:
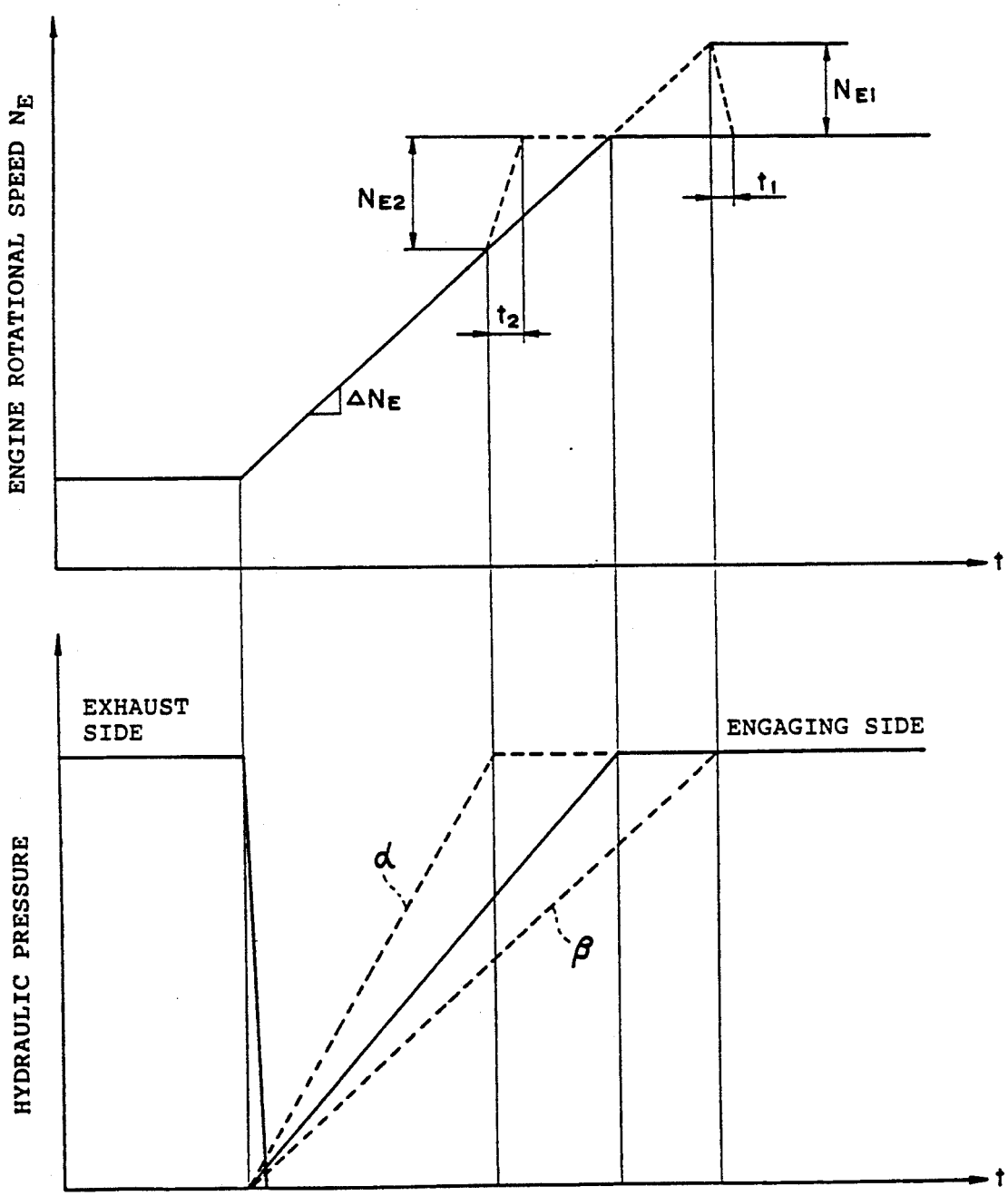
FIG. 9 is a graph showing the rotating state of an engine in a case where the engagement time is inappropriate.

As shown in FIG. 9, if the second brake B1 is engaged (as indicated by the dashed line $a$) before the engine rotation is synchronized, the engine braking phenomenon occurs. On the other hand, if engagement of the brake is delayed (as indicated by the dashed line $\beta$), then engine revving will occur.

Figure 3:
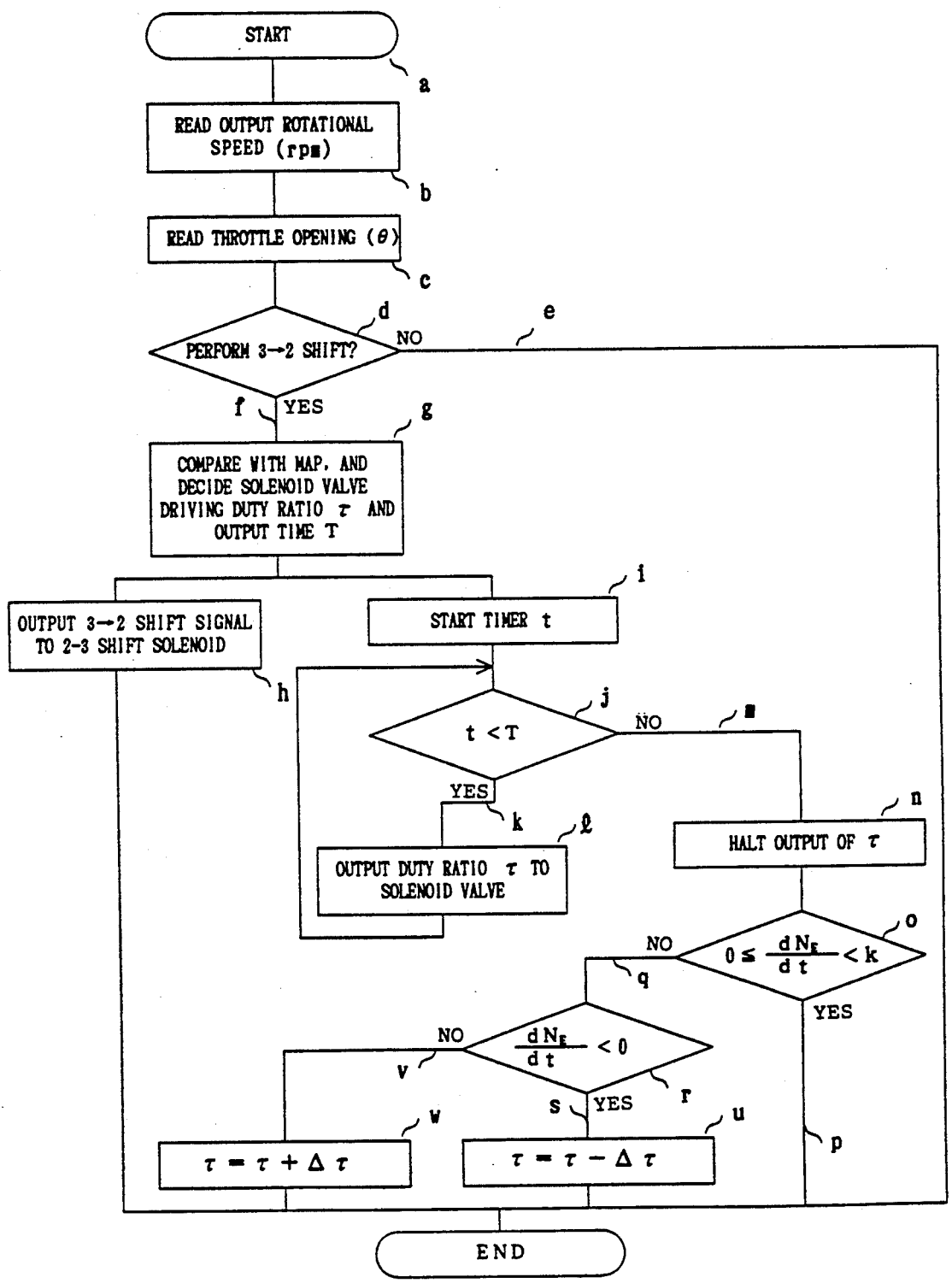
FIG. 3 is a flowchart for computer control in the same embodiment.

When output time T elapses (path m) in the flowchart of FIG. 3, the output of the duty ratio $\tau$ is terminated at step (n). The engine rotational speed is monitored by the engine rotation sensor 17 for a time T' (e.g., $T_E$) following termination of the duty ratio output, engine revving and a rapid increase in the rotational speed are discriminated at step (o) based on the rate of change in the engine rpm. In other words, in a case (path p) where the rate $dN_E/dt$ of the rise in engine rpm shown in FIG. 9 is within prescribed limits ($0 \leq dN_E/dt < k$), running of the program is ended. In a case (path q) where the rate $dN_E/dt$ of the rise in engine rpm is not within prescribed limits, it is discriminated at step (r) whether the rate of rise in engine rpm is diminishing (e.g., whether $dN_E/dt$ is positive or negative). In a case (path s) where the rate of rise in engine rpm becomes negative (i.e., where $dN_E/dt$ becomes negative), engine revving is discriminated and the duty ratio $\tau$ is reduced (step u) by $\Delta\tau$ in conformity with the amount of decline $N_{E1}$ in rotational speed (or in conformity with the time $t_1$ required for the decline), thereby shortening the engagement time. In a case (path v, $dN_E/dt \geq k$) where $dN_E/dt$ is equal to or larger the predetermined valve k (i.e., very large), occurrence of the vehicle braking phenomenon is discriminated and the duty ratio $\tau$ is increased (step w) by $\Delta\tau$ in conformity with the amount of rise $N_{E2}$ in rotational speed (or in conformity with the time $t_2$ required for the rise), thereby lengthening the engagement time.

If a change in the throttle opening in excess of a predetermined amount is detected during the time T' ($T_E$), the correction is suspended.

By thus continuously monitoring engine rotational speed, the duty-ratio output is corrected by control based on learning if engine rotational speed is revved up or undergoes a sudden increase. This makes it possible to cope with differences in tolerance among individual parts and with changes that accompany the passage of time.

The rise in hydraulic pressure is slower when the A/T oil temperature (O/T) is low than when it is high, even at the same vehicle velocity. However, with the shift control apparatus described above, it is possible to apply a correction which hastens the rise in hydraulic pressure by changing the duty ratio of the solenoid valve in conformity with the oil temperature (O/T).

Figure 10:
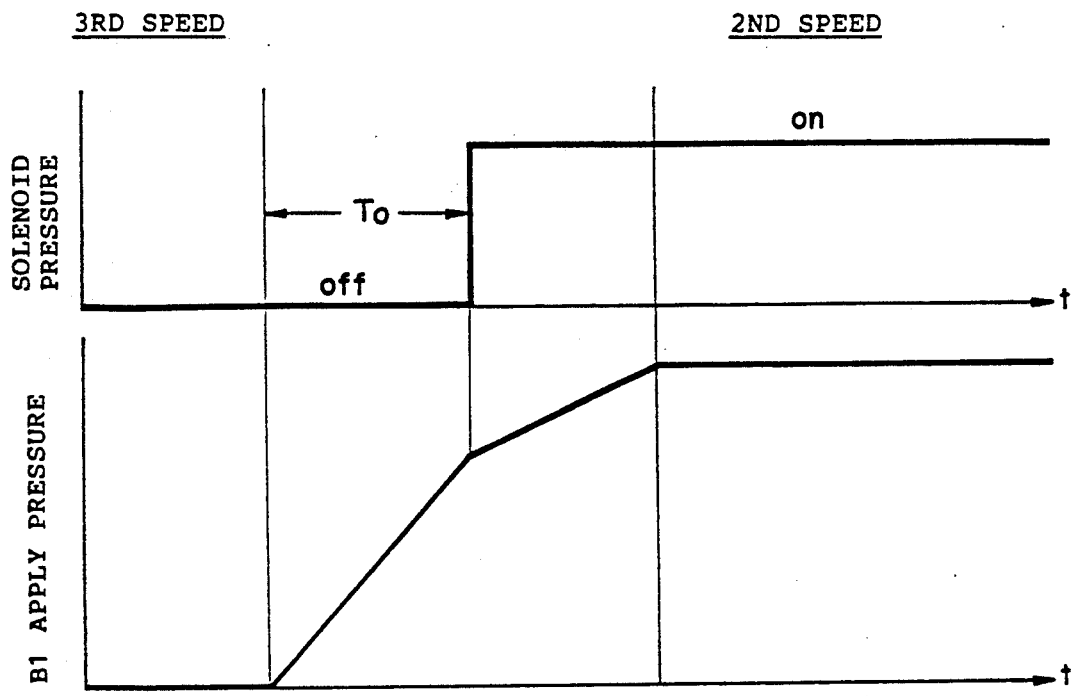
FIG. 10 is a hydraulic-pressure characteristic for illustrating the relationship between solenoid operation and hydraulic-pressure rise time in another embodiment of the present invention.
Figure 11:
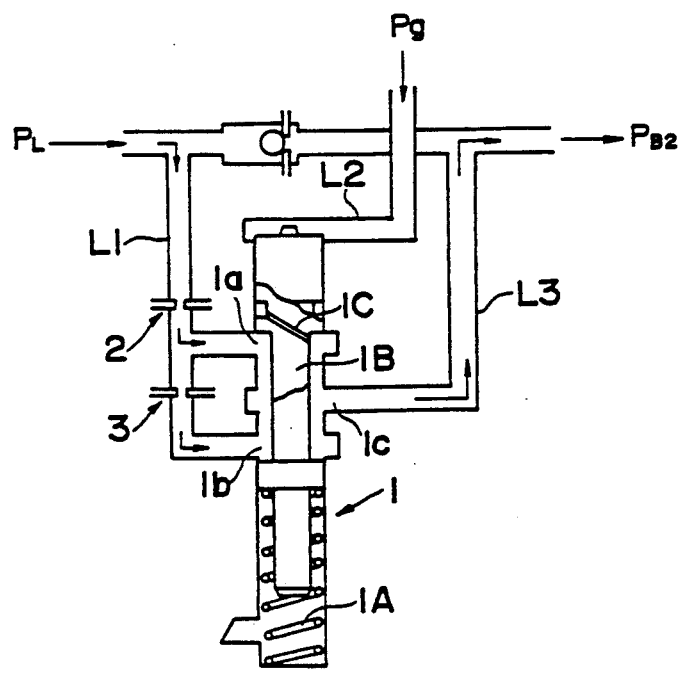
FIGS. 11 through 13 are schematic hydraulic circuits showing an example of the prior art.
Figure 12:
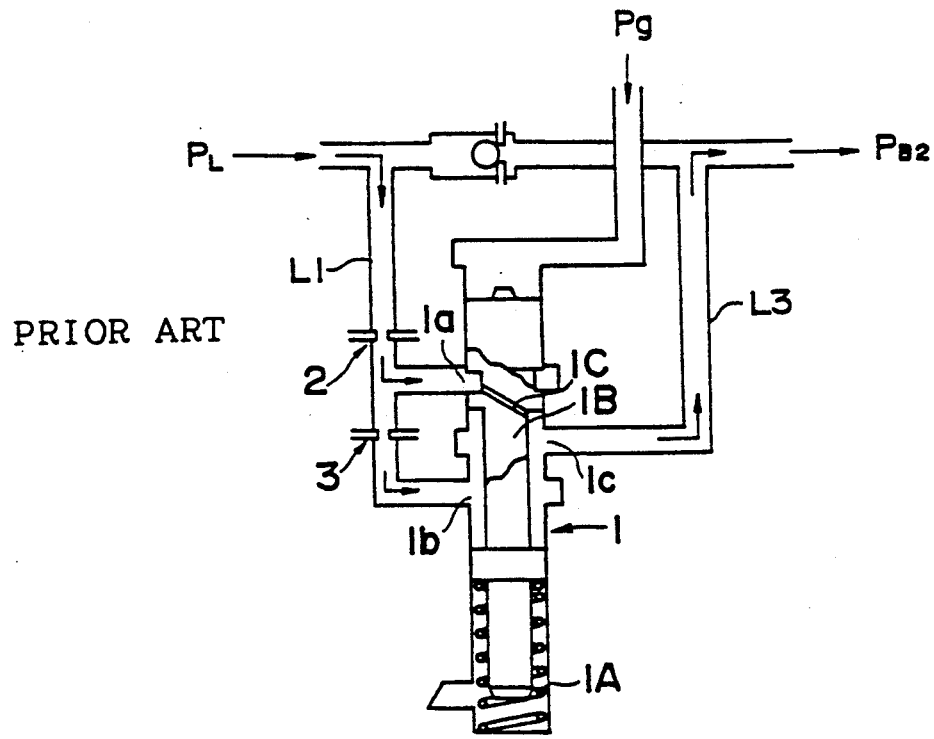
Figure 13:
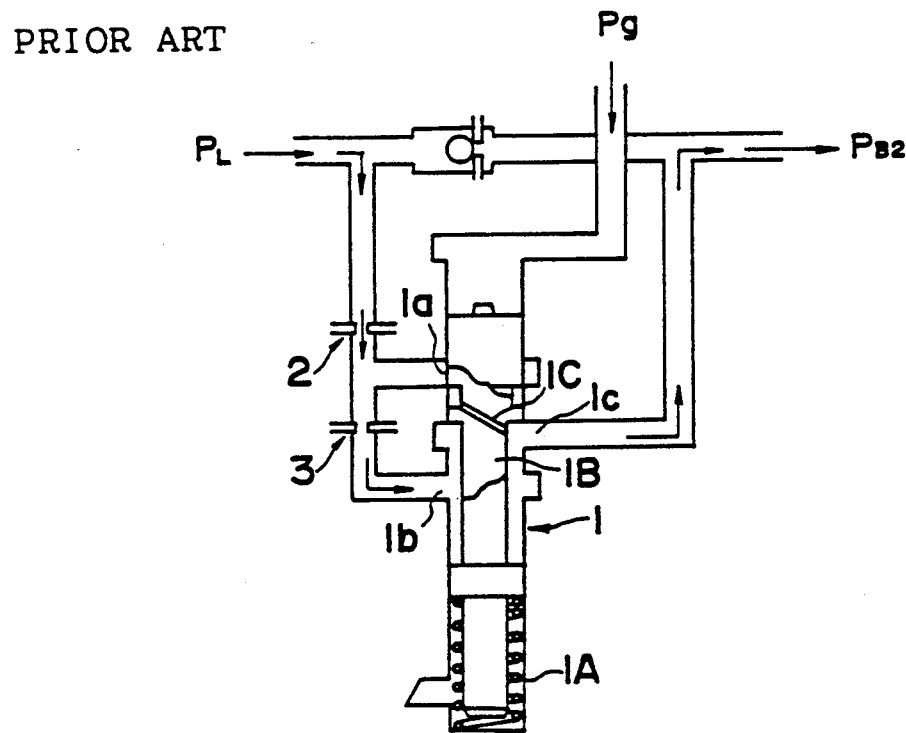

In another conceivable embodiment of the invention, the solenoid valve 13 can be changed over by a timer setting. This would be an alternative to controlling the duty of the solenoid valve 13. More specifically, as shown in FIG. 10, the solenoid valve is opened for $T_0$ seconds starting from the rise in B1 apply pressure, after which the solenoid valve is closed, thereby providing the desired apply time period. As in the embodiment described above, engagement time of the second brake B1 in the medium-velocity region is set at will.

As many apparently widely different embodiments of the present invention can be made without departing from the spirit and scope thereof, it is to be understood that the invention is not limited to the specific embodiments thereof except as defined in the appended claims.

What is claimed is:

1. A shift control apparatus for an automatic transmission, comprising:
   a kickdown orifice control valve for changing over two hydraulic pressure supply systems which supply engaging hydraulic pressure to friction engaging elements on an engaging side via at least one orifice by sliding a spool between a first position at which the spool is urged by a spring and a second position at which the spool is urged by changeover hydraulic pressure acting in a direction opposite the spring;

a solenoid valve mounted at a point along a line which introduces the changeover hydraulic pressure;

control means for controlling opening and closing of said solenoid valve; and said control means includes duty control means for controlling the duty of said solenoid valve based on a duty ratio corresponding to vehicle velocity and throttle opening.

2. The shift control apparatus according to claim 1, wherein said two hydraulic pressure supply systems comprise supply lines including a line for supplying hydraulic pressure via one orifice and a line for supplying hydraulic pressure via at least two orifices.

3. The shift control apparatus according to claim 1, wherein said control means has correcting means for detecting engine rotational speed and correcting the duty ratio in conformity with the rotating state of the engine.

4. The shift control apparatus according to claim 1, wherein said control means has correcting means for correcting the length of time of operation of said solenoid valve in accordance with the rotating state of the engine.

5. A shift control apparatus for an automatic transmission, comprising:

a kickdown orifice control valve for changing over two hydraulic pressure supply systems which supply engaging hydraulic pressure to friction engaging elements on an engaging side via at least one orifice by sliding a spool between a first position at which the spool is urged by a spring and a second position at which the spool is urged by changeover hydraulic pressure acting in a direction opposite the spring;

a solenoid valve mounted at a point along a line which introduces the changeover hydraulic pressure;

control means for controlling opening and closing of said solenoid valve; and said control means includes delay means for delaying operation of said solenoid valve for a length of time corresponding to vehicle velocity and throttle opening following output of a shift command signal.

6. The shift control apparatus according to claim 5, wherein said control means has correcting means for correcting the length of time of operation of said solenoid valve in accordance with the rotating state of the engine.

7. The shift control apparatus according to claim 5, wherein said two hydraulic pressure supply systems comprise supply lines including a line for supplying hydraulic pressure via one orifice and a line for supplying hydraulic pressure via at least two orifices.

* * * * *